Sept. 14, 1965    J. L. LEESON, JR    3,206,640
SYNCHRONIZING ARRANGEMENT FOR AIRPLANE ENGINES OR THE LIKE
Filed Dec. 29, 1960    3 Sheets-Sheet 3
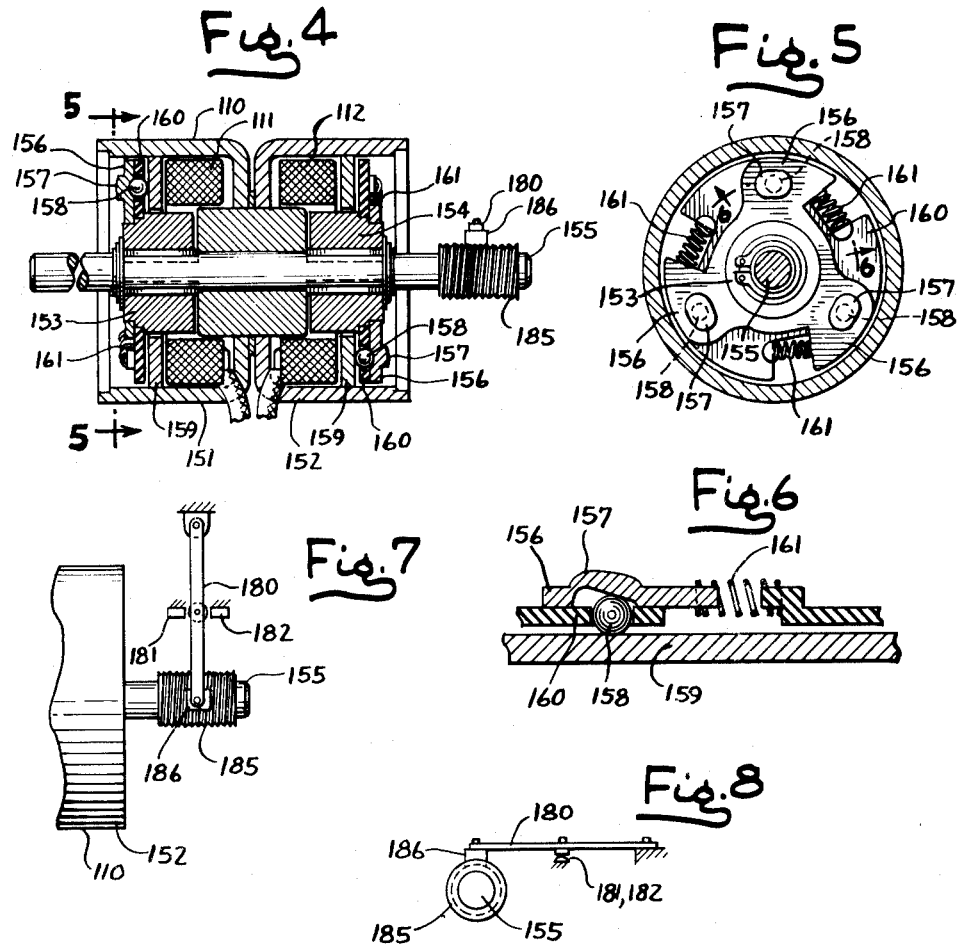
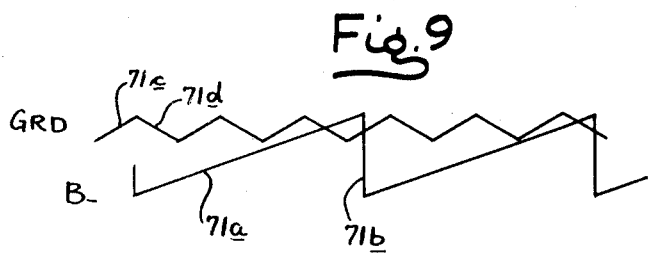
INVENTOR
JAMES L. LEESON, JR.
by Wolfe, Hubbard, Voit &
                          Osann
                                ATTYS

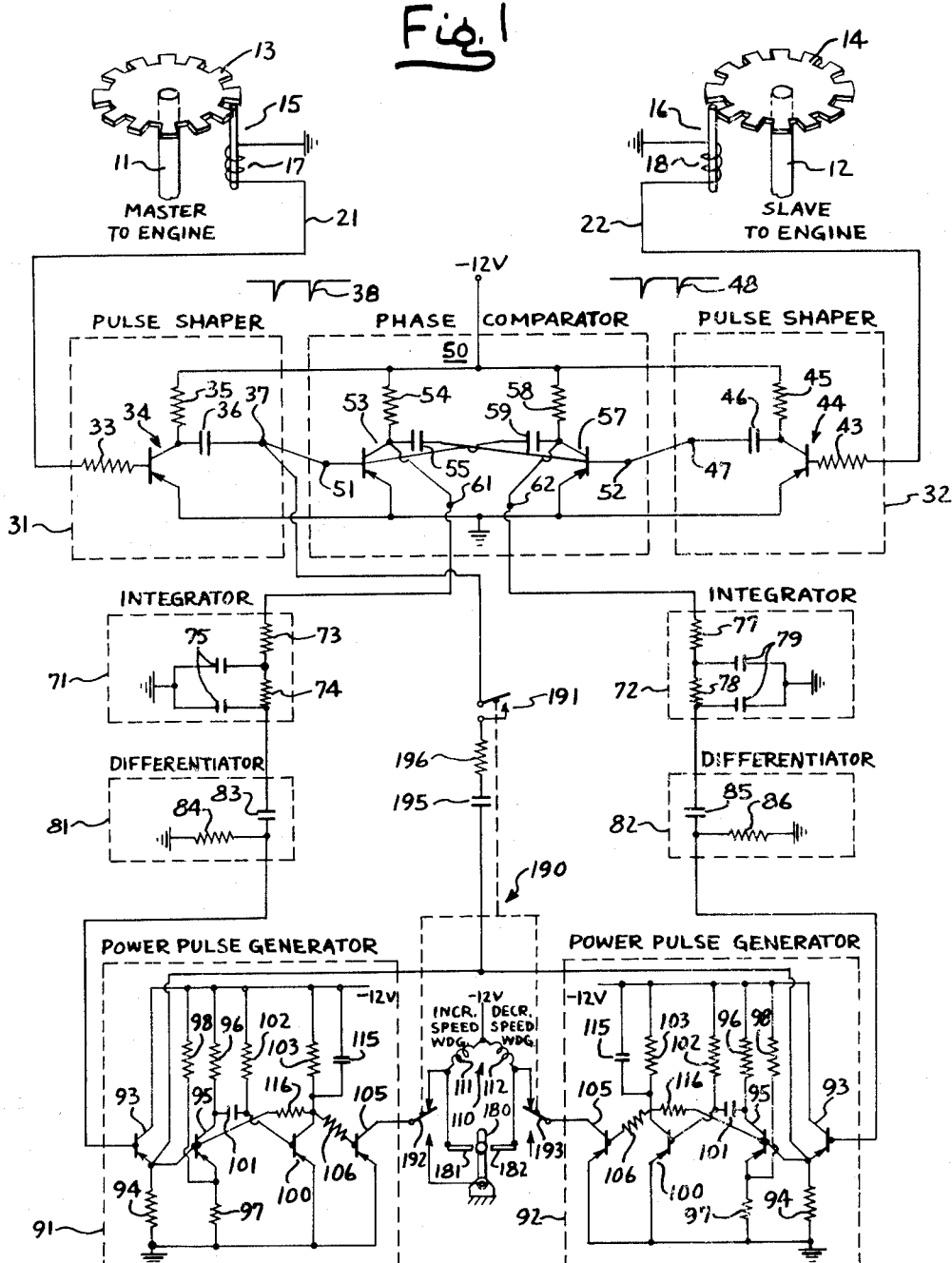

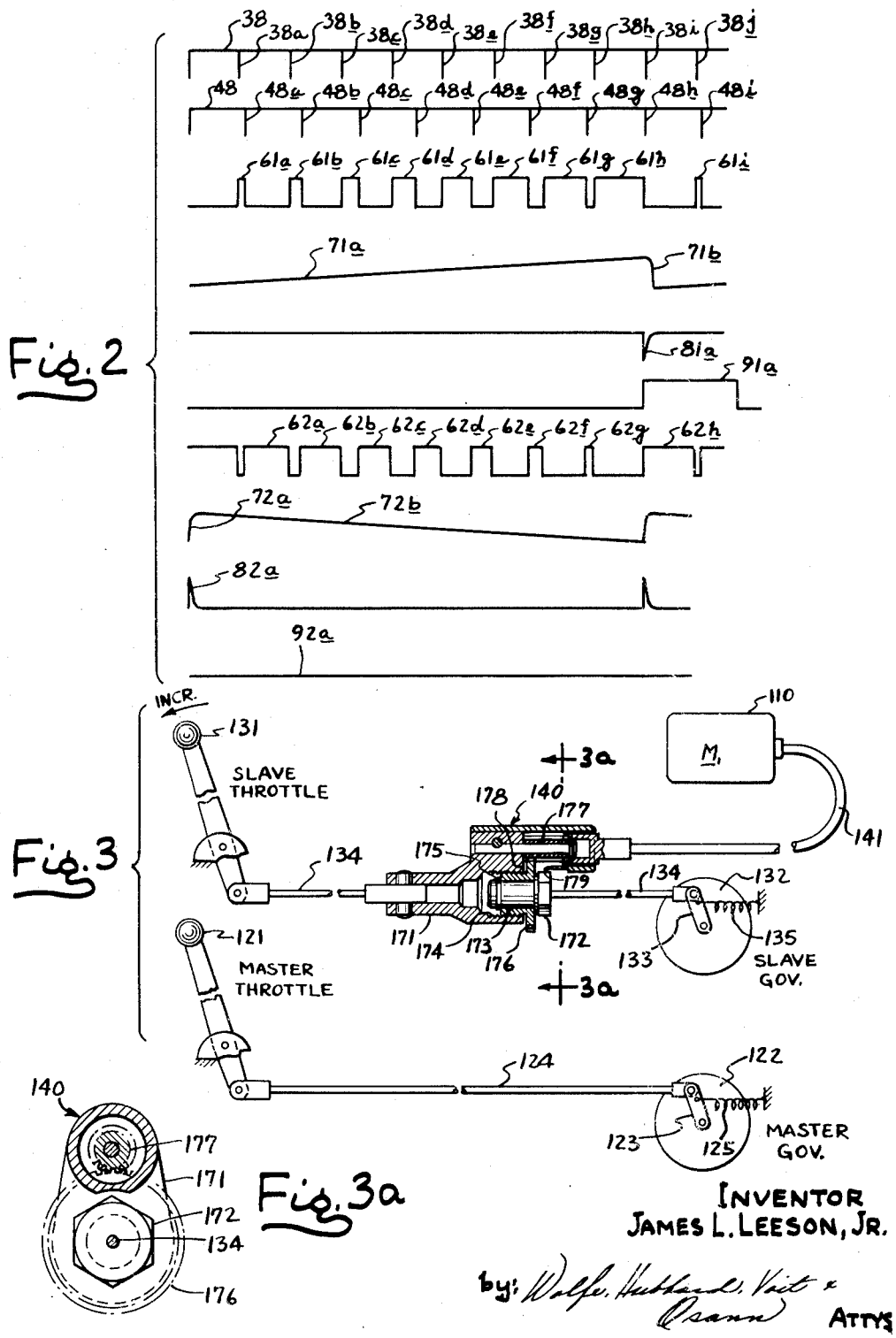

United States Patent Office 3,206,640
Patented Sept. 14, 1965

3,206,640
SYNCHRONIZING ARRANGEMENT FOR AIRPLANE ENGINES OR THE LIKE
James L. Leeson, Jr., Beloit, Wis., assignor to Woodward Governor Company, Rockford, Ill., a corporation of Illinois
Filed Dec. 29, 1960, Ser. No. 79,404
13 Claims. (Cl. 317—6)

The present invention relates to a synchronizer for comparing the speed of a master and slave engine and for making corrective speed adjustment to maintain the two engines in synchronism.

In the operation of airplane engines it is desirable to have all of the engines on the aircraft operate at precisely the same speed in order to avoid objectionable throbbing or "beats." However the synchronizing devices which have been employed in the past have not been sufficiently accurate or responsive as the condition of exact synchonism is approached. Also such devices have been slow to respond or, upon increasing sensitivity, susceptible to hunting and overswing. For the most part they have been mechanically involved and have not exhibited the extremely high degree of reliability required on an expensive aircraft.

Accordingly it is an object of the present invention to provide a synchronizing device which is highly accurate and which is capable of a high degree of resolution at or near the synchronous point. It is a more specific object of the present invention to provide a synchronizing arrangement for aircraft engines or the like capable of operating in the critical region of near-synchronism, which is stable, inherently positive in operation, and which does not require adjustment once it is placed in operation. It is a further object of the present invention to provide a synchronizing arrangement in which the parts are non-critical and in which a wide variety of inexpensive transistors may be employed without necessity for using especially selected units. It is a more detailed object, relative to the foregoing, to provide a two-channel synchronizing circuit which employs "on-off" circuitry throughout responsive to presence or absence of a signal and, except for one circumstance to be discussed, not to the changing level thereof. Consequently it is an object to provide a synchronizing circuit which is independent of such variable factors as variations in the voltage of the power supply. It is still another and related object to provide a synchronizing control circuit which is independent of temperature variations over the entire range which may be encountered in aircraft.

It is another object to provide a synchronizing device which is rapid in response and which, nevertheless, does not run the risk of hunting or overshoot.

It is a further object of the invention to provide an engine synchronizing device which has a narrow band of response and in which automatic attenuation of the synchronizing signal occurs when a large discrepancy exists between the speeds of the master and slave engine. Thus the synchronizing device is automatically incapacitated for large speed discrepancies so that, upon failure of the master engine, the slave will not be pulled down in speed in accordance with the speed of the master. It is yet another object to provide an engine synchronizing device in which the range of adjustment is, moreover, mechanically limited but which is self-protecting and proof against overload, so that any efforts to effect further adjustment do not result in any strain or damage and without necessity for using limit switches or other special disabling means.

It is still another object of the present invention to provide a synchronizing arrangement which is mechanically simple and which may be quickly and easily interposed in the throttle control linkage of the slave engine; consequently, it is an object to provide a synchronizer which may be easily added to aircraft already in the field. It is a related object of the present invention to provide a synchronizing arrangement having speed pickup elements which may be almost universally applied within the governor of any commercial aircraft without substantial modification.

In one of the aspects of the present invention it is an object to provide a synchronizing arrangement including a mechanical adjusting device interposed in the throttle linkage with means for insuring that the adjusting device is initially at the center of its range of adjustment, thereby insuring that adequate adjustment is available in either the upward or downward direction. In this connection it is an object of the invention to provide a centering device which makes use of the circuitry employed for synchronization and which may be actuated simply by throwing a switch prior to placing the device in its synchronizing mode.

It is another object of the present invention to provide a synchronizing arrangement for aircraft engines which is extremely lightweight and compact, employing transistors and with all the circuitry being capable of inclusion on a circuit board measuring but a few inches in each dimension.

Other objects and advantages of the invention will become apparent upon reading the attached description and upon reference to the drawings in which:

FIGURE 1 is a complete circuit diagram of a synchronizing device constructed and arranged in accordance with the present invention.

FIG. 2 shows the wave forms at various points in the circuit of FIG. 1.

FIG. 3 is a diagrammatic view, in partial section, showing an adjusting device controlled by the synchronizing circuitry interposed in the throttle linkage of the slave engine.

FIG. 3a is a detail view taken in section substantially along the line 3a—3a in FIG. 3.

FIG. 4 is an axial cross section of a reversible stepping motor used in practicing the present invention.

FIG. 5 is a transverse section taken along the line 5—5 in FIG. 4.

FIG. 6 is a fragmentary section taken along the curved line 6—6 in FIG. 5.

FIG. 7 is a top view, in simplified form, of a centering switch embodied in the motor of FIG. 4.

FIG. 8 is a side view, also in simplified form, of the centering switch shown in FIG. 7.

FIG. 9 is a plot of a saw tooth wave under conditions of small and large speed discrepancy.

While the invention has been described in connection with a preferred embodiment it will be understood that I do not intend to be limited thereto but intend to cover the various alternative and equivalent devices which may be included within the spirit and scope of the appended claims.

Turning now to FIG. 1 there is shown a schematic circuit diagram of a synchronizing system arranged in accordance with the present invention. The invention is described as applied to a master engine and a slave engine on a twin engine aircraft, although it will be apparent as the discussion proceeds that the invention is applicable to any multi-engine aircraft or to analogous applications where one or more power units are to be "slaved" in synchronism with a unit selected as the master. Thus the shaft 11 may be understood to be connected to the master engine and the shaft 12 to a slave engine. Conveniently the shaft 11 and 12 may be the rotating shafts in the respective engine governors.

For the purpose of producing a repetitive pulsed output signal proportional in frequency to speed, with a predetermined number of pulses being indicative of a single revolution, toothed wheels 13 and 14 are mounted on the shafts and cooperate with pickup elements 15, 16 respectively. The pickup element 15 preferably has a coil 17 surrounding a permanent magnet while the element 16 is provided with a coil 18. The result is to produce voltage waves in output lines 21, 22 respectively at the rate of, say, 40 pulses per revolution, the number corresponding to the number of teeth on the wheel. It will be understood that in the place of the specially toothed wheels 13, 14, gears forming a part of the engine may be utilized. However, it is found that employing wheels designed for the purpose enables a better output wave form to be achieved than is possible using regular gears and, moreover, the pickup elements 15, 16 may be more readily mounted in an engine governor than in other portions of the engine.

For the purpose of converting the trains of pulses in the lines 21, 22, respectively to more sharply defined pulses, pulse shapers 31, 32 are used. Taking the pulse shaper 31 by way of example, it includes an input resistor 33 and a transistor 34, the input signal being fed to the base in a common emitter circuit and with a load resistor 35 in series with the collector element. The voltage at the collector terminal is differentiated by a capacitor 36 to produce a peaked output signal as indicated at 38 (FIG. 2). Corresponding numerals 43–48 apply to the companion pulse shaper 32. Operation is as follows: The negative portion of the input pulse to the transistor is effective to cause collector current to flow. The signal from the pickup element 15 is sufficient to saturate the transistor 34 so that the current which flows in the collector circuit consists of a train of "clipped" square waves. When the square waves are differentiated by the coupling capacitor 36, the result is to produce a series of sharp pulses 38. These go in both the positive and negative direction but, because of the rectifying action which occurs at the input of the following transistor in the channel, only the negative pulses are effective to produce current flow; consequently these are the only ones which need to be shown.

In accordance with the present invention a bi-stable or flip-flop device is provided having a pair of input terminals connected to receive the "speed" pulses and of a type wherein the arrival of a pulse at the input terminals is effective to cause "flipping" of the circuit from one of its stable states to the other, with the result that square waves of output voltage are produced at the output of the flip-flop which are of progressively increasing width or progressively decreasing width depending upon whether the slave is slow or fast. Moreover, means responsive to the condition of increasing width or decreasing width are provided for correctively speeding up or slowing down the slave engine. Thus in the present embodiment a flip-flop device 50 is provided having a first input terminal 51 and a second input terminal 52. The circuit includes a first transistor 53 having a load resistor 54 and coupling capacitor 55 as well as a second transistor 57 having a load resistor 58 and a coupling capacitor 59. Both load resistors are connected to a source of negative or "B—" voltage. The coupling capacitors are, as shown, and as conventional in flip-flop circuitry, cross-connected from the collector or output elements to the base or input elements respectively. The output terminals, indicated at 61, 62, are respectively connected to the collector elements and exhibit the swinging potentials which exist at the collectors due to the changes in the voltage drops in the respective load resistors.

In describing the operation of the flip-flop 50 it will be helpful to refer to FIG. 2 which shows the wave forms at various points in the circuit. When the slave is slow, the negative input pulses conducted to the input terminals 51, 52 will not arrive simultaneously. On the contrary the first pulse, indicated at 38a in FIG. 2, will arrive from the master engine first. This causes current to flow through the load resistor 54 associated with the first transistor causing the voltage at the output terminal 61 to go from substantially B— to a value which is near ground potential. When the first transistor becomes conducting, it applies a positive-going voltage to the base element of the opposite transistor 57, thereby insuring that that transistor is non-conducting. However, when a pulse 48a is received at a slightly later time at the second terminal 52, this causes the transistor 57 to become conductive, causing a flow of current in the collector circuit. The resulting positive-going voltage is coupled to the base of the transistor 53 by the capacitor 59, turning off the transistor and thereby defining a narrow square wave 61a. The width of the square wave is thus a measure of the existing phase displacement between the pulses 38a and 48a, and the device thus may be considered as a phase comparator.

The transistor 53 remains turned off until a negative pulse 38b is received at the input terminal 51 which again turns the transistor 53 on as indicated at 61b. The transistor 53 remains conductive (with the transistor 57 non-conductive) until a negative input pulse 48b is received at the input terminal 52 which causes the second transistor to become conductive and the first, through the capacitor 59, to become non-conductive defining a second square wave 61b of output voltage. It will be noted that the square wave 61b is wider than the square wave 61a, indicating an increase in the phase discrepancy. Since, as assumed, the two engines are rotating at different speeds, the phase discrepancy between them will continue to increase. Thus it will be noted that subsequent square waves in the train, namely, 61c–61h, are progressively wider until the two engines are again, momentarily, back in phase with one another, which completes a single train or cycle of square waves. Following the square wave 61h of maximum width, the subsequent square wave 61i is narrow and corresponds to the initial square wave 61a to begin a new train or cycle.

In the above attention has been focused upon the square waves of voltage of increasing width which appear at the output terminal 61. It will be understood by one skilled in the art that the square waves of output voltage which appear at the collector of the second transistor, and which are fed to a second channel, are a mirror image thereof, consisting of series of complementary square waves 62a–62h which are of progressively shorter width.

In carrying out the present invention means are provided for converting the trains of square waves to control pulses in forward and reverse channels for forward and reverse operation of a speed control motor for correctively controlling the speed of the slave. In the present embodiment this conversion is accomplished by first integrating the trains of square waves from the flip-flop and then differentiating the outputs of the integrator thereby producing one impulse for each group of successive square waves in each channel (see groups 61a–h and 62a–h in FIG. 2). Thus I provide at output terminals 61, 62 of the flip-flop circuit, a first integrating device 71 and a second integrating device 72. The first integrator is made up of resistors 73, 74 and capacitors 75. The second includes an identical circuit made up of resistors 77, 78 and capacitors 79. Using an integrator 71 of relatively short time constant, and which in the present embodiment be on the order of 10 milliseconds, a saw tooth output wave is produced having a gradually increasing slope as indicated in FIG. 2 at 71a and an abrupt dropoff as indicated at 71b. The reason for the gradually increasing slope, somewhat idealized in the drawing, is that electric charge is fed into the capacitors at a progressively increasing rate but is leaked therefrom at a constant rate. When the increase is terminated, as it is at the end of a discrete train of square waves, the voltage drops rather abruptly with a subsequent gradual buildup in the next cycle.

For the purpose of converting the saw tooth wave into a single sharp pulse for control purposes, differentiators are used as indicated at 81, 82 respectively. The differentiator 81 includes a capacitor 83 and resistor to ground 84, while the differentiator 82 uses a capacitor 85 and resistor 86. Focusing attention upon the left hand channel, the output of the differentiator 81 is in the form of a negative pulse 81a. Meanwhile in the second channel square waves of decreasing width 62a–62h produce an abrupt rise 72a in voltage at the output of the integrator 72, followed by a gradual tapering off of voltage over the cycle as shown at 72b. When this saw tooth wave is differentiated by the differentiator 82 a sharp positive pulse 82a is produced. In other words, the differentiators 81 and 82 constitute two means for producing output pulses in response to the abrupt transitions in the sawtooth waves supplied thereto, the polarity of the pulses depending upon the sign of the slope of the input sawtooth wave.

In carrying out the present invention means are provided at the output of the differentiators for responding to control pulses of one polarity while being non-responsive to the pulses of opposite polarity. In the present instance, only negative control pulses are utilized in each channel while positive pulses are ignored. For the purpose of providing such polarity discrimination and for producing power pulses of a magnitude sufficient to actuate a speed-correcting motor, power pulse generators 91, 92 are used in respective channels.

Attention is next turned to the details of the power pulse generator 91 in order to understand the manner in which such circuit produces powerful square wave output pulses upon being trigered by input pulses from the differentiator 81. Forming the input stage of the pulse generator is a transistor 93 having a load resistor 94 connected in its emitter circuit. This first stage produces relatively low level output and its output is in phase with the input analogously to a conventional cathode follower. Since conduction can only take place in the output circuit upon receipt of a negative input signal, the stage acts as a polarity discriminator, causing the power pulse generator as a whole to be responsive only to input pulses of negative polarity while ignoring the pulses of positive polarity which may come from the differentiator 81. In other words, the power pulse generator 91 produces output pulses only when the speed of the slave is slow as compared to the master. Conversely, the power pulse generator 92 in the opposite channel, and which receives its signal from the opposite output terminal of the flip-flop, contains identical circuitry and thus is effective to produce an output signal to the motor only when the slave is running fast.

With the above in mind attention may next be given to the remainder of the pulse generator circuit. It includes a second transistor 95 having a load resistor 96 and a biasing circuit consisting of resistors 97, 98. The output of the transistor 95 is fed to the input of a transistor 100 through a coupling circuit comprising a coupling capacitor 101 and input resistor 102. Connected to the collector circuit of the transistor 100 is a load resistor 103. Finally, the output of the transistor 100 is connected to a power type output transistor 105 through a coupling resistor 106. Arranged in the load circuit of the amplifying transistor is a winding 111 of a motor 110, the second winding 112 of the motor being connected in the opposite channel.

Because the first stage is connected as a cathode follower while the remaining three stages provide polarity inversions, it will be apparent that under normal conditions, i.e. up to the time of receipt of a negative pulse, output transistor 105 will be non-conductive. However, in carrying out the invention means are provided within the pulse generator for producing sustained output pulses having a length which is adequate to produce positive operation of the motor 110, with the input pulses being utilized simply to trigger the circuit. To accomplish this "holding action" a feedback connection is provided between the output of the transistor 100 and the input of the preceding transistor 95, in the form of a resistor 116, and the value of the coupling capacitor 101 is so chosen as to have a relatively large storage capacity. The "holding action" is actually accomplished by the capacitor 101, which also provides coupling. To make the unit less susceptible to triggering due to random fluctuations of the power supply, particularly when one side has fired, a capacitor 115 is connected in parallel with the load resistor of the third transistor 100.

The manner in which such components act to provide output pulses of predetermined length will be apparent upon considering a typical operating sequence. Upon receipt of a negative input pulse at the transistor 93 the output of the transistor swings in a negative direction because of the cathode follower connection. This negative voltage is applied to the input of the transistor 95 which is normally biased to be non-conductive. This transistor conducts, producing a positive-going output voltage which is coupled to the input of the succeeding transistor 100 by the coupling capacitor 101, causing the transistor 100 to become non-conductive. As a result the output or collector terminal of the transistor 100 swings negative which has two effects. The first effect is to apply negative voltage to the input of the amplifying transistor 105 causing the transistor to conduct heavily through the winding 111. The second effect is to apply a negative voltage, through the feedback resistor 116, to the input of the preceding transistor 95. The resistor 116 thereby provides a second or "holding" input for the transistor 95. Thus when the short negative input pulse is terminated, the transistor 95 does not revert to its non-conducting state but a negative voltage persists on the base terminal thereof causing the transistor to continue to conduct. Such conduction takes place for a finite length of time depending upon the capacitance of the capacitor 101, which tends to sustain a predetermined voltage at the output of the transistor 100.

Negative voltage also continues to be applied for such time interval to the input of the amplifying transistor with the result that the winding 111 is energized by current flow therethrough for a predetermined time interval (indicated by the current pulse 91a in FIG. 2) which greatly exceeds the length of the input pulse. When the charge on the holding capacitor 101 reaches an equilibrium value, there is no longer sufficient negative voltage to sustain the transistor 95 in its conducting state so that the transistor reverts to non-conduction. The latter causes its output terminal to swing negative, and the negative-going voltage is coupled through the capacitor 101 to the input of the transistor 100 causing the same to be conductive. As a consequence the output terminal thereof swings in the positive direction, producing cut-off in the output transistor 105 and terminating flow of current in the winding 111 connected in its load circuit.

The circuitry of the power pulse generator 92 is, as stated, identical to that described for the generator 91, and corresponding reference numerals are used. However, under conditions when the slave is slow, only positive pulses (see 82a in FIG. 2) are fed from the differentiator 82 to the pulse generator 92. Since the input stage is non-responsive to positive pulses, the power pulse generator in the second channel is idle and no current pulses are supplied to the winding 112, as indicated at 92a in FIG. 2. It will be understood that when the opposite condition exists, that is, when the slave is fast, the condition of the wave forms shown in FIG. 2 is reversed so that the power pulse generator 92 receives the negative pulses required to produce a useful ouput while the power pulse generator 91, receiving positive pulses only, is inactive.

In carrying out the present invention the motor 110 is preferably in the form of a stepping motor having alternatively energizable windings for correctively adjusting a control element in the governor of the slave engine in order to bring it toward synchronism with the master. It will be apparent however that the invention is not limited to use with a stepping motor, and a split field D.C. motor may be used if desired.

In order to understand the construction of the stepping motor and the manner in which it is coupled to the speed control system of the aircraft, reference is made to FIGS. 3–6, FIG. 3 being a diagrammatic showing of the linkage interconnecting the throttles with governors on the respective engines. Thus the master throttle indicated at 121 is connected to a master governor 122 having a control element 123, the connection being made to the latter via a cable 124. The control element 123 has a return spring 125 and it will be understood that sufficient friction is provided in the master throttle to hold a desired throttle setting. Arranged adjacent the master throttle 121 is a slave throttle 131 controlling a slave governor 132 having a control element 133 via a cable 134 and with tension being provided by a return spring 135. Interposed in the run of the cable 134 is an adjustable link 140, the latter being connected to the motor 110 via a flexible cable 141 for the purpose of adjustably lengthening or shortening the cable 134 thereby to provide adjustment of the speed of the slave engine.

Prior to discussing the manner in which adjustment is brought about in the adjustable link 140, attention may first be directed to the internal construction of the motor 110 (FIG. 5). This motor is of the type in which axial magnetic attraction is converted to a step of rotary movement, such motors being commercially available under the trade name Ledex. The present motor includes two magnetic structures 151, 152 which act independently upon armatures 153, 154 to rotate a shaft 155 in one direction or the other. Focusing attention upon the armature 153, it includes a flange having outwardly projecting lobes 156. Each of the lobes has a ramp 157 (see Fig. 6) formed therein within which rides a ball 158 riding on a flat surface 159. The balls are held captive within a floating retainer 160, with springs 161 being provided between the retainer and the respective lobes in order to urge the balls 158 to the shallow end of the ramps. When the armature 153 is sucked inwardly upon energization of the coil 111, two components of force are applied to each of the balls 158, an inward component and a peripheral component. The peripheral component causes the armature 153 to ride down hill on the ramps 157, giving a step of peripheral movement which may be one-eighteenth of a full revolution. When the winding is deenergized pressure is no longer applied to the balls 158 and the balls are thus free to be moved by the retainer 160 under the urging of the springs 161 back to the initial position illustrated in FIG. 6. It will be apparent that when a succession of current impulses are applied to the winding 111, the result is step-by-step forward advancement of the shaft 155. Corresponding elements are employed with the coil 112 for rotation of the shaft in the opposite direction.

With the construction of the motor 110 in mind, further attention may be given to the construction of the adjusting link 140 as shown in FIG. 3. The device has a body 171 having a movable or output element 172 to which the portions of the cable 134 are connected. In order to change the effective length of the link, the movable output element 172 is mounted in a threaded bushing 173 which engages a tapped thread 174. Relative rotation is permitted and members 172, 173 are held together by a retaining ring 175. For the purpose of rotating the threaded bushing 173, a gear 176 is integrally formed thereon cooperating with a drive pinion 177, the gear being restricted to axial movement between stops 178, 179, which determine the limits of available adjustment.

It will be apparent, then, that when the slave is slow the winding 111 of the motor is energized with a series of pulses rotating the motor shaft which results in rotation of the threaded bushing 173 which has the effect of adjustably lengthening the cable 134 associated with the slave throttle 131. Conversely, when the slave is fast the winding 112 is energized producing rotation of the motor in the opposite direction thereby adjustably shortening the throttle linkage so slow down the slave engine.

In accordance with one of the aspects of the invention means are provided for insuring that the adjustable link 140 is in its mid position when the synchronized system is put into operation. More specifically, the motor is provided with auxiliary centering contacts causing a series of specially produced pulses to be fed to the appropriate motor winding to produce rotation of the motor in a direction to center the linkage. In order to understand the construction of centering contacts, reference is made to FIGS. 3, 4, 7 and 8. In these figures it will be noted that the motor is provided with a single-pole double-throw contact arm 180 having contacts 181, 182 on each side thereof. For the purpose of moving the switch arm 180 to a centered position, a worm 185 is provided on the motor shaft 155. Engaging the worm 185 is a grooved rider 186 which is pinned or otherwise secured to the movable end of the arm 180. The rider may be made of nylon or the like.

For the purpose of supplying centering pulses to the motor windings, a control switch assembly 190 is provided which consists of three switches ganged together and indicated at 191, 192, 193 (FIG. 1). The switch 191 serves to connect the second stage of the power pulse generator 91 directly to the pulse shaper 31 via a coupling capacitor 195 and series resistor 196. Thus when the switch 191 is closed, a series of driving pulses appear at the output of the power pulse generator. For the purpose of feeding such pulses to the movable arm of the centering switch, a single-pole, double-throw switch 192 is provided. To disconnect the motor winding 112 from the power pulse generator 92 to which it is normally connected, the disconnect switch 193 is used. It will be apparent, then, that when the switch assembly 190 is operated pulses will be supplied to the contact arm, and if the arm is in an off-center position, appropriate contact will be made with either fixed contact 181 or 182 to feed the pulses to the proper one of the windings. Thus rotation of the motor occurs accompanied by movement of the arm 180 until the arm is restored to the central position illustrated in FIG. 7, whereupon the motor turns itself off. When this occurs the switch assembly 190 may be restored to its normal condition for normal synchronizing operation.

*Résumé of operation*

While the operation of the device will be apparent from the above description it may be helpful to summarize it briefly. Input pulses are fed from the pickup units 15, 16, associated with the respective engines. Such pulses are shaped by the pulse shapers 31, 32 and applied to the inputs 51, 52 of the phase comparator flip-flop 50. When the slave engine is slow, the input pulses to the flip-flop will be out of phase as shown at 38, 48 in FIG. 2. This produces at the output terminal 61 successive trains of square wave pulses of increasing width. Upon passing such trains of pulses through the integrator 71, saw tooth waves are produced having positive slope and sharp drop-off. When the saw tooth waves are differentiated by the differentiator 81, the sharp drop-off produces a negative pulse 81a, one pulse for each of the square wave trains. Such pulse is used to trigger the power pulse generator producing a powerful output pulse 91a of predetermined duration which is applied to the winding 111 of the motor 110, causing the motor to advance one step. It will be understood that, as long as the engines are not synchronized, the trains of square wave pulses of increasing width will continue to be produced at the output of the flip-flop, resulting in a series of input pulses to the motor with progressive rotation of the motor shaft and progressive change in length of the link 140. During the time that negative control pulses are applied to the generator 91, positive control pulses are applied to the pulse generator 92 in the opposite channel but these are ignored by the generator since the input stage thereof is polarity-sensitive. Conversely when the slave engine is fast, the functions of the two channels are precisely reversed and power pulse generator 92 receives the negative pulses to rotate the motor in the opposite direction.

It will be understood that the present device is capable of responding to extremely small differences in the speed of the two engines, with a high degree of resolution near the point of synchronism. The reason for this is that the flip-flop is not responsive to velocity, as such, but responsive to phase differences. A difference in velocity, even though extremely small, will inevitably give rise to phase differences which are accurately detected and interpreted by the flip-flop to produce a positive output signal. Corrective action takes place with great rapidity. The present device is thus to be contrasted with other synchronizing devices which tend to suffer a lack of resolution under near-synchronous conditions and which are inherently slow to respond.

It is one of the features of the present device that it has "narrow band" characteristics, providing corrective action only when speed of the slave is within a certain range of the speed of the master. Thus upon failure or stoppage of the master engine, causing rapid decrease in the master speed, the large speed differential produces a change in both the magnitude and wave shape of the output signal from the integraters 71 and 72, causing the power pulse generators to be non-responsive so that the speed of the slave is not dragged down with that of the master. To produce triggering of the power pulse generators the latter are adjusted so that a triggering pulse of a certain minimum magnitude must be received. Under normal synchronizing conditions where the speeds are nearly equal the trains of square waves produced by the flip-flop are sufficiently well defined (as shown in FIG. 2) and have sufficient energy content so as to produce a fairly well defined "saw tooth" 71a, 71b. The abrupt change in the signal, indicated at 71b, upon being differentiated, produces a sharp pip which is more than sufficient to trigger the power pulse generator. However, as the speed discrepancy becomes greater, the wave appearing at the output of the integrator 71 becomes reduced in magnitude and the change in voltage becomes gradual rather than abrupt, producing a shallow wave 71c, 71d as graphically set forth in FIG. 9. Upon being differentiated such wave does not yield the sharp and positive output pulses which are required to operate the power pulse generator; such pulses as may be produced by differentiation tend to be of equal magnitude in both the positive and negative directions. The result of this is that if the power pulse generators 91, 92 are triggered at all they are triggered together so that action at the stepping motor is indecisive, with no net advancement in either direction. The stepping motor is designed to withstand simultaneous energization of both of the windings without damage so there is no mechanical risk involved.

Moreover it will be apparent that if, upon failure of the master engine, sufficient pulses are produced to drive the motor in the "corrective" direction, as may occur under some conditions of adjustment of the circuit, interference will soon take place at one of the stops 178, 179 in the adjustable link 140 preventing any further speed change. Thus it can be stated by way of summary that the device tends to be immune to large discrepancies in speed caused by engine failure but, in any event, provides for mechanical limitation of the speed change which may occur in the slave engine. It is to be noted that the device is immune to the effects of bottoming at the stops since the stepping motor, although it may be actuated, will simply refuse to step after the bottoming occurs with no danger to the motor or link. This is to be contrasted with motor driven gear trains which may develop destructive torques upon bottoming of limit stops and which therefore require use of limit switches or similar protective arrangements. The present device does not require the complication of limit switches. The "narrow band" feature of the present device does not, in fact, constitute any limitation upon the normal synchronizing action. Thus it is a simple matter for the pilot to operate the throttle controls in order to bring the slave to within the controlled range. Automatic "centering" is accomplished by throwing the switch assembly 190 previously described, following which the switches are restored to their synchronizing mode and with the slave engine thereafter being maintained in a condition of near-perfect synchronism with the master without further care or attention on the part of the pilot or engineer. It is to be particularly noted that while the device is accurate, exhibiting a high degree of resolution, nevertheless it is entirely non-critical as regards individual circuit components. Inexpensive transistors may be employed without necessity for using specially selected or "paired" units. The circuit is of the "on-off" or "go-no go" type so that there is no reliance upon changes in signal level nor dependence upon changes in supply voltage. The only exception to this freedom from signal level is the action which takes place upon failure of the master engine where response to decreased signal levels provides a novel protective function. Being independent of signal level variations under normal synchronizing conditions the device is also insensitive to wide temperature variations as may occur in aircraft due to the result of altitude variation.

The device is simple and compact with the electronic circuitry requiring a circuit board not much larger than a postcard. The synchronizer may be easily added to existing designs of aircraft and aircraft already in the field simply by interposing the adjustable link 140 in the throttle control linkage. Where three slave engines are to be controlled, it will be apparent that this is simply a matter of pairing the master signal separately with the three slave signals, using an adjustable link in the throttle linkage of each slave governor.

While the preferred form of the invention has been disclosed it will be apparent that numerous circuit modifications may be made still employing the same inventive concept. For example, while two complete channels have been illustrated in FIG. 1, it would be possible, if desired, to eliminate the second integrator and differentiator by feeding the power pulse generator 92 directly from the output of the first differentiator 81 via a phase inverter. Also, if desired, any equivalent bi-state circuit or device may be employed for reading the trains of output square waves to determine if they are of increasing width or decreasing width as the criterion for increasing or decreasing the speed of the slave engine.

In reading the following claims it will be understood that the synchronizing arrangement is not limited to use with aircraft engines but is applicable wherever it is desired to synchronize the speeds of first and second moving members or to synchronize any two devices capable of producing repetitive output pulses at slightly differing rates. In the latter event the term "speed" is not necessarily limited to rotative speed but may be applied to the rate at which the devices act to produce the output pulses. It will also be understood that the term "flip-flop" is not limited to the specific embodiment of bi-state device which is disclosed, and it will be understood by one skilled in the art that the term applies equally to devices having equivalent input and output characteristics without departing from the invention.

I claim:

1. In a sychronizing arrangement for a master and slave air craft engine or the like, the combination comprising, means responsive to the speed of the master and slave for generating respective pulses of current at rates proportional to the speeds thereof, a flip-flop device having a pair of input terminals and a pair of output terminals with the input terminals being connected to the respective pulse generators so that the device is placed in one condition by a pulse from the master and in the opposite condition by a pulse from the slave with the result that the output terminals produce output voltage in the form of complementary trains of successive square waves containing groups of increasing width or decreasing width depending upon whether the slave is slow or fast, integrating means respectively connected to such output terminals for generating saw tooth waves having positive or negative slopes depending upon whether the square waves within successive groups applied thereto are of increasing or decreasing width, differentiating means respectively connected to the outputs of the integrating means for differentiating the saw tooth waves to produce well defined pulses of a polarity dependent upon the sign of the slopes of the saw tooth waves, and means including a reversible motor having forward and reverse windings respectively coupled to said differentiating means and responsive to pulses of a given polarity for correctively increasing and decreasing the speed of the slave.

2. In a synchronizing arrangement for a master and slave air craft engine or the like, the combination comprising, means responsive to the speed of the master and slave for generating pulses of current at a rate proportional to the respective speeds thereof, a flip-flop device having a pair of input terminals and a pair of output terminals with the input terminals being respectively connected to the pulse generators so that the device is placed in one condition by a pulse from the master and in the opposite conditions by a pulse from the slave with the result that the output terminals produce output voltages in the form of trains of successive square waves of increasing width or decreasing width depending upon whether the slave is slow or fast, means energized by said square waves for producing successive sawtooth waves of positive or negative slope when the square waves are increasing or decreasing in width, means for differentiating said sawtooth waves to produce output pulses at the abrupt transitions thereof, and first and second speed control means connected to receive said output pulses and responsive to the polarity relation thereof for respectively speeding up or slowing down the slave engine.

3. In a synchronizing arrangement for a master and slave air craft engine or the like, the combination comprising, means responsive to the speed of the master and slave for generating pulses of current at a rate proportional to the respective speeds thereof, a flip-flop device having a pair of input terminals and a pair of output terminals with the input terminals being respectively connected to the pulse generators so that the flip-flop device is placed in one condition by a pulse from the master and in the opposite condition by a pulse from the slave with the result that at least one of the output terminals produces output voltage in the form of successive groups of recurring square waves of increasing width or decreasing width depending upon whether the slave is slow or fast, and means energized by said square waves and including an integrator and a differentiator connected in tandem in the order named for correctively adjusting the speed of the slave engine to synchronize it with the master engine.

4. In a synchronizing arrangement for a master and slave air craft engine or the like, the combination comprising, means responsive to the speed of the master and slave for generating respective pulses of current at a rate proportional to the speed thereof, a flip-flop device having a pair of input terminals and a pair of output terminals with the input terminals being connected to the pulse generators so that the device is placed in one condition by a pulse from the master and in the opposite condition by a pulse from the slave with the result that at least one of the output terminals produces output voltage in the form of successive groups of square waves of increasing width or decreasing width depending upon whether the slave is slow or fast, integrating means connected to such output terminal for generating saw tooth waves having positive or negative slope depending upon whether the groups of square waves applied thereto are of increasing or decreasing width, differentiating means connected to receive said sawtooth waves from said integrating means for producing output pulses at the abrupt transitions in said sawtooth waves, the polarity of such output pulses being determined by the slope of the sawtooth waves, and means responsive to said output pulses for acting upon the slave to increase or decrease the speed thereof depending upon whether the slope of the saw tooth waves is positive or negative.

5. In a synchronizing arrangement for a master and slave air craft engine or the like, the combination comprising, means responsive to the speed of the master and slave for generating pulses of current at a rate proportional to the respective speeds thereof, a flip-flop device having a pair of input terminals and a pair of output terminals with the input terminals being respectively connected to the pulse generators so that the flip-flop device is placed in one condition by a pulse from the master and in the opposite condition by a pulse from the slave with the result that at least one of the output terminals produces an output voltage in the form of successive groups of square waves of increasing width or decreasing width depending upon whether the slave is slow or fast, integrating means responsive to said square waves for producing successive sawtooth waves having slopes of one sign or the other when the square waves are respectively increasing or decreasing in width, differentiating means responsive to said sawtooth waves for producing output pulses at the abrupt transitions of said sawtooth waves, means including a motor and responsive to the polarity of said output pulses for producing rotation in one direction or the other, and governor means responsive to the rotation of the motor for correctively varying the speed of the slave.

6. In a sychronizing arrangement for a master and slave air craft engine or the like, the combination comprising, means responsive to the speed of the master and slave for generating respective pulses of current at a rate proportional to the speed thereof, a flip-flop device having a pair of input terminals and a pair of output terminals with the input terminals being connected to the pulse generators so that the device is placed in one condition by a pulse from the master and in the opposite condition by a pulse from the slave with the result that at least one of the output terminals produces output voltage in the form of successive groups of square waves of increasing width or decreasing width depending upon whether the slave is slow or fast, integrating means connected to such output terminal for generating saw tooth waves having positive or negative slope depending upon whether the square waves applied thereto are of increasing or decreasing width, differentiating means for converting the saw tooth waves to output pulses of one polarity or the other depending upon the sign of slope, and means including a motor responsive to the output of said converting means for acting upon the slave to increase or decrease the speed thereof in accordance with the polarity of the output pulses.

7. In a synchronizing arrangement for a master and slave aircraft engine or the like, the combination comprising means responsive to the speed of the master and slave for generating pulses of current at a rate proportional to the respective speeds thereof, a flip-flop device having a pair of input terminals and a pair of output terminals with the input terminals being respectively connected to the pulse generators so that the flip-flop device is placed in one condition by a pulse from the master and in the opposite condition by a pulse from the slave with the result that at least one of the output terminals produces output voltage in the form of successive groups of square waves of increasing width or decreasing width depending upon whether the slave is slow or fast, means for generating an output pulse for each train of waves and of a polarity which depends upon the condition of increasing or decreasing width respectively, a reversible stepping motor having forward and reverse windings, means for coupling said output pulses to said windings respectively for rotation of the motor in one direction or the other depending upon the polarity of such pulses for respectively speeding up or slowing down the slave engine.

8. In a synchronizing arrangement for a master and slave aircraft engine or the like, the combination comprising means responsive to the speed of the master and slave for generating respective pulses of current at a rate proportional to the speed thereof, a flip-flop device having a pair of input terminals and a pair of output terminals with the input terminals being connected to the pulse generators so that the device is placed in one condition by a pulse from the master and in the opposite condition by a pulse from the slave with the result that the output terminals produce output voltage in the form of complementary trains of square waves of increasing width or decreasing width depending upon whether the slave is slow or fast, an integrating device connected to each output terminal for generating saw tooth waves having positive or negative slope depending upon whether the square waves applied thereto are of increasing or decreasing width, a differentiating device connected to receive each of said sawtooth waves for producing at the abrupt transitions thereof output pulses of a polarity depending upon the sign of the slopes of such sawtooth waves, and separate speed control means connected to receive said output pulses and responsive to the polarities thereof for respectively increasing or decreasing the speed of the slave.

9. In a synchronizing arrangement for a master and slave aircraft engine or the like, the combination comprising means responsive to the speed of the master and slave for generating respective pulses of current at a rate proportional to the speed thereof, a flip-flop device having a pair of input terminals and a pair of output terminals with the input terminals being connected to the pulse generators so that the device is placed in one condition by a pulse from the master and in the opposite condition by a pulse from the slave with the result that at least one of the output terminals produces output voltage in the form of successive groups of recurring square waves of increasing width or decreasing width depending upon whether the slave is slow or fast, integrating means connected to receive said square waves for producing recurring sawtooth waves of one slope sign or the other when the square waves are respectively increasing or decreasing in width, differentiating means connected to receive said sawtooth waves for producing output pulses at the abrupt transitions of the latter, such pulses having a polarity determined by the sign of the slope of the sawtooth waves, means including a linkage for manually controlling the speed of the slave, an adjustable link interposed in said linkage, a reversible motor and means for energizing the same with said output pulses so that the motor operates in one direction or the other depending upon whether the output pulses are of one polarity or the other, and means coupling the motor to the link for adjusting the effective dimension thereof thereby to correctively adjust the speed of the slave.

10. In a synchronizing arrangement for a master and slave aircraft engine or the like, the combination comprising means responsive to the speed of the master and slave for generating respective pulses of current at a rate proportional to the speed thereof, a flip-flop device having a pair of input terminals and a pair of output terminals with the input terminals being connected to the pulse generators so that the device is placed in one condition by a pulse from the master and in the opposite condition by a pulse from the slave with the result that at least one of the output terminals produces output current in the form of trains of square waves of increasing width or decreasing width depending upon whether the slave is slow or fast, integrating means connected to receive said square waves for producing recurring sawtooth waves of one slope sign or the other when the square waves are respectively increasing or decreasing in width, differentiating means connected to receive said sawtooth waves for producing output pulses at the abrupt transitions of the latter, such pulses having a polarity determined by the sign of the slope of the sawtooth waves, means including a linkage for manually controlling the speed of the slave, an adjustable link interposed in said linkage, a reversible motor and means for energizing the same with said output pulses so that the motor operates in one direction or the other depending upon whether the output pulses are of one polarity or the other, means coupling the motor to the link for adjusting the effective dimension thereof thereby to correctively adjust the speed of the slave, and means including a centering switch connected to said motor and so arranged that when the switch is in the centering mode current is fed to the motor windings to produce rotation of the motor accompanied by adjustment of the link to the center of its range of adjustment.

11. In apparatus for synchronizing the speeds of a master and a slave engine or the like, the combination comprising means for sensing the speeds of the master and slave engines and producing two signals respectively indicative of such speeds, means responsive to said two signals for generating an intermediate signal of recurring, substantially sawtooth waveform when said engine speeds are unequal and with the sign of the slope of the sawtooth waveform corresponding to the sense of the speed unequality, and means including a differentiator responsive to said intermediate signal for correctively changing the speed of the slave engine in one sense or the other when the slope of the sawtooth waveform respectively has one sign or the other, thereby to synchronize the master and slave engine speeds.

12. In apparatus for synchronizing the speeds of a master and a slave engine or the like, the combination comprising means for producing a first signal indicative of the speed of the master engine, means for producing a second signal indicative of the speed of the slave engine, a bi-state device including means for producing an output signal of recurring square waveform as the device successively changes from its one state to its other state, means responsive to said first signal for periodically driving said bi-state device to its one state at a rate proportional to the speed of the master engine, means responsive to said second signal for periodically driving said bi-state device to its other state at a rate proportional to the speed of the slave engine, means for integrating said output signal to produce an intermediate signal of recurring sawtooth waveform having a slope of one sign or the other when the mismatch of the master and slave speeds respectively has one sign or the other, means for differentiating said intermediate signal to produce recurring pulse signals of one polarity or the other when the slope of the sawtooth waveform has one sign or the other, and means responsive to said pulse signals when the latter have a given polarity for correctively adjusting the speed of the slave engine towards equality to the speed of the master engine.

13. The combination set forth in claim 12, further characterized in that the last-named means includes means which are responsive to said pulse signals of said given polarity only if said pulse signals exceed a predetermined amplitude, thereby to create corrective action only when the speed of the slave engine is within a predetermined narrow band of departure from the speed of the master engine.

References Cited by the Examiner
UNITED STATES PATENTS

| | | | |
|---|---|---|---|
| 2,774,872 | 12/56 | Howson | 328—155 X |
| 2,877,854 | 3/59 | Brahm | 317—6 |
| 2,934,756 | 4/60 | Kalmus | 324—83 X |
| 2,972,087 | 2/61 | Chilman et al. | 317—6 |
| 3,064,173 | 11/62 | Brun et al. | 317—6 X |

SAMUEL BERNSTEIN, *Primary Examiner*.